Nov. 4, 1958 J. J. VASTANO 2,858,665
ORNAMENTAL SHELL MOUNTING MEANS FOR CHAIN LINKS
Filed Dec. 14, 1954 2 Sheets-Sheet 1

*INVENTOR.*
JOSEPH J. VASTANO
*BY*
Maxwell J. Perrotta
ATTORNEY

Nov. 4, 1958 J. J. VASTANO 2,858,665
ORNAMENTAL SHELL MOUNTING MEANS FOR CHAIN LINKS
Filed Dec. 14, 1954 2 Sheets-Sheet 2
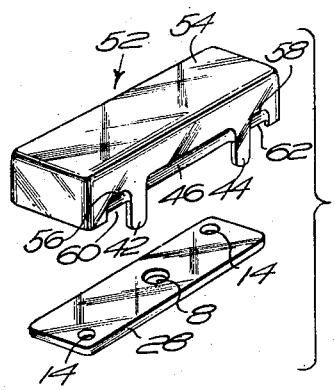
FIG. 9
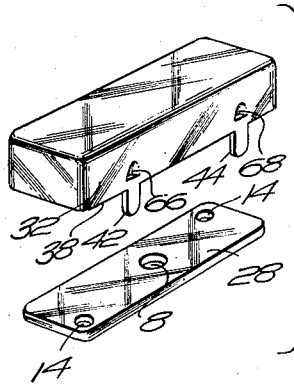
FIG. 12
FIG. 10
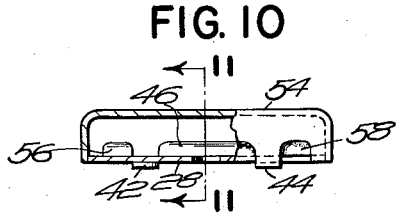
FIG. 13
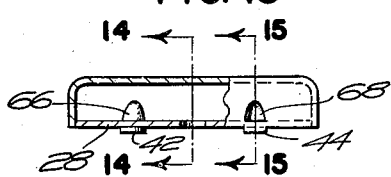
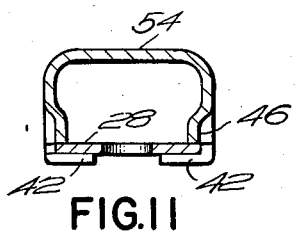
FIG. 11
FIG. 15
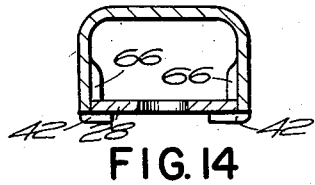
FIG. 14
INVENTOR.
JOSEPH J. VASTANO
BY
Maxwell J. Parrotta
ATTORNEY

United States Patent Office 2,858,665
Patented Nov. 4, 1958

2,858,665

ORNAMENTAL SHELL MOUNTING MEANS FOR CHAIN LINKS

Joseph J. Vastano, East Providence, R. I., assignor to Flex-Let Corporation, East Providence, R. I., a corporation of Rhode Island Application December 14, 1954, Serial No. 475,164

5 Claims. (Cl. 59—79)

The present invention relates to improvements in link chain for expansible bracelets and more particularly has to do with an improved construction of the individual link and shell combination of which the link chain is comprised.

Heretofore, in expansible link chain for bracelets, where the decorative shell is formed with an upper surface and flanges depending therefrom substantially at right angles thereto, it has been necessary to provide some means for preventing the link from being pushed too far inwardly into the shell. The reason for such requirement has been that without such means, the clearance necessary for the rivets or other pivot means and the springs is not assured and good expansion and contraction characteristics for the link chain could not be expected. One arrangement that has prevented such objectionable telescoping of the link into the shell requires modification of both the link and the shell. The link is modified by the addition of laterally projecting parts which, of course, not only require the use of additional stock but also increase the overall weight of the resulting construction. The shell is modified by recessing the depending flanges at the portions corresponding with the laterally projecting parts of the link so that the latter seats on the former and tab or tongue extensions on the depending flanges are bent to hold the link against the recessed flange portions. Although such recessed portions of the shell are essentially concealed when the construction is in its contracted relationship, when expanded such recesses are visible and therefore undesirable. Moreover because the tab or tongue extensions are located intermediate the recesses and the laterally projecting parts, assembly does introduce certain objectionable bending moments in the shell and link.

Another tendency inherent in such prior art arrangement is the tendency of the link to bow upwardly and inwardly into the shell. This is occasioned by the engagement of the laterally projecting parts of the link with the cooperative recessed edges of the depending flanges of the shell and pressure of the tab extensions on the link and because of the remoteness of the engagement between the projecting parts and the flange edges with respect to the engagement of the tab extensions of the link.

In view of the foregoing it is a primary object of the present invention to provide an improved construction whereby at least some of the foregoing objectionable or less desirable features are overcome or obviated.

More particularly it is an object of the present invention to provide an improved combinative assembly of shell and link wherein it is unnecessary for the link to be provided with any laterally projecting parts so that the shape of the link can conform to the interior of the shell with which it cooperates, thus keeping stock requirements for and weight of the resulting construction minimized.

Another object of the present invention is to provide an improved link and shell arrangement wherein the transverse bending moment imparted to the link which tends to bend the longitudinal center portion of the link upwardly and inwardly into the shell is either entirely eliminated or minimized by locating the seating for the link inwardly of the depending flanges of the shell and thus substantially opposed to the force of the tab extensions which retain the link thereagainst.

A further object of the present invention is to provide an improved construction of shell and link wherein the longitudinal bending moment imparted to the link is substantially eliminated by locating the seating of the shell directly opposite to the tab extensions, and yet wherein it is unnecessary to provide special recesses in the shell or special projecting parts on the link.

A still further object of the present invention is to provide an improved construction of the shell and link combination such that the shell requires no recesses and yet receives the link therein and holds the link from excessive movement into the shell by the provision of inwardly struck portions located in aligned and spaced relation to the tab extensions.

Still other objects of the present invention are to provide a construction that is simple and inexpensive to manufacture and assemble and yet which has strength superior to that in prior art link chain construction.

Another object of the present invention is to provide an improved link and shell construction wherein the previous forming operations are not unduly complicated and are also of an improved nature.

Various other objects and advantages will become apparent from the detailed description to follow.

In the drawings:

Figure 9 is an enlarged detail perspective exploded view of a modified form of shell and link assembly, springs and pivots being omitted for clarity;

Figure 10 is a side elevational view of the modified assembly shown in Figure 9, parts being shown in section;

Figure 11 is a vertical transverse sectional view taken substantially along the plane of line 11—11 of Figure 10;

Figure 12 is an enlarged detail perspective exploded view similar to Figure 9 but of my preferred modification of improved shell and link assembly;

Figure 13 is a side elevational view of the modified assembly shown in Figure 12, parts being shown in section;

Figure 14 is a transverse sectional view taken substantially along the plane of line 14—14 of Figure 13; and Figure 15 is a transverse sectional view taken substantially along the plane of line 15—15 in Figure 13.

Figure 1:
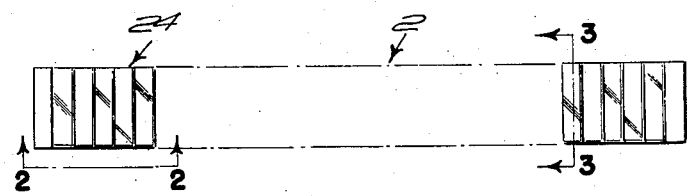
Figure 1 is a top plan view of an expansion type bracelet embodying the improvements of the present invention.
Figure 2:
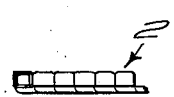
Figure 2 is a view taken substantially along the plane of line 2—2 of Figure 1.
Figure 3:
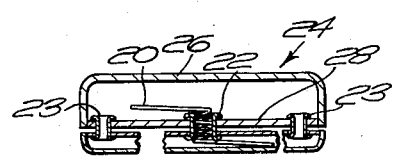
Figure 3 is a view taken substantially along the plane of line 3—3 of Figure 1.
Figure 4:
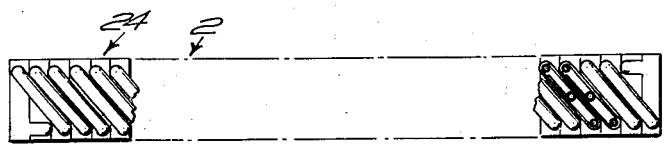
Figure 4 is a bottom plan view of the bracelet of Figure 1 parts being broken away to show the skeleton assembly.
Figure 5:
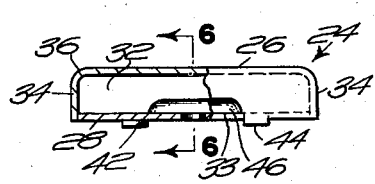
Figure 5 is an enlarged detail side elevational view of one of the shell and link assemblies, part being broken away to show the assembly in section.
Figure 6:
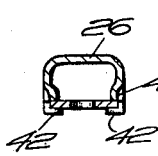
Figure 6 is a transverse sectional view taken substantially along the plane of line 6—6 of Figure 5.
Figure 7:
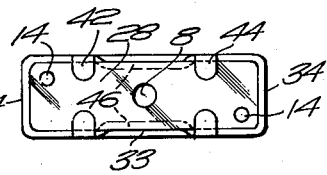
Figure 7 is a bottom plan view of the assembly of Figure 5.

Referring more particularly to the drawings wherein like numerals apply to like parts throughout, and with particular reference to Figures 1-4, it will be seen that the numeral 2 designates an entire expansible type bracelet which is comprised of a series of top links 4 and a series of bottom links 6, each link of each of the series is provided with a center eyelet 8, top link, or 10, bottom link, and outer eyelets 12 and 14, top link, or 16 and 18, bottom link. Each bottom link 6 is pivotally connected at its center with the center of the overlying top link 4, and the ends of the bottom link 6 are pivotally connected with the overlying ends of top links lying at either side of the top link to which the center of the bottom link is pivotally connected. Suitable springs 20 are inserted through the hollow rivets 22 which pass through the center eyelets of the top and bottom links to effect the pivotal inter-connection. Such means as has been described is intended to be merely descriptive of one type of expansible bracelet with which the present invention can be employed. A more detailed description of an expansible bracelet above described can be found in my prior Patent No. 2,444,864, issued July 6, 1948.

Having reference now to Figures 5 through 8, it will be seen that I have shown a first form of shell and link assembly 24 of which the expansible bracelet 2 of Figure 1 can be constructed. The assembly 24 is comprised of a shell 26 cooperative with a link 28 which represents either a top or bottom link. The shell 26 is of decorative design and may assume shapes other than the rectangular shape shown. Also although the top surface 30 of the shell is shown smooth, it is contemplated that various three dimensional effects or other designs might be used. The shell 24 has depending side and end flanges 32 and 34, respectively, which extend substantially at right angles with respect to the plane of the top surface 26, a slight radius portion joining the same at 36.

Figure 8:
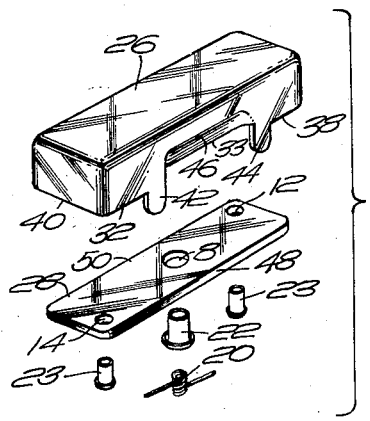
Figure 8 is an enlarged detail perspective exploded view of a shell and link assembly.

As seen best in Figure 8, the side and end depending flanges 32 and 34 terminate in substantially planar edges 38 and 40. An edge portion of the side depending flanges 32 is cut away or recessed at 33 by an amount substantially equal to the thickness of the link 28 with which it is to be cooperatively associated. Integral tab or tongue extensions 42 and 44 are formed at each side of the cutaway portion and on each of the depending flanges 32. The inside shape and dimensions are similar to but slightly greater than the shape and dimensions of the link 28. As shown both are rectangular but may be of different shape as desired. The difference in dimensions between the inside of the shell and periphery of the link represents clearance which sometimes is in the order of .001 inch at each side, the stock for the shells usually being in the order of .008 inch thick.

Because of the cutaway portions at each side at 33, additional edges and edge portions are provided at 46. At least part of the edge portions 46 is inwardly offset by being inwardly struck or deformed from the remaining portions of the side flanges. The extent of offset is dependent upon the amount of clearance and at the very minimum is greater than the combined clearances at each side between the link and shell. Preferably the extent of offset is several times the total clearance. While the offset shown is provided by deformation of the edge portion 46, it will be realized that certain other modes of forming can be utilized.

The link 28 is as above pointed out of rectangular shape and has the center and outer eyelets 8, 12 and 14 formed therein. In assembly, the link 28 is received within the shell 26 and its side edge portions 48 and 50 are engaged with the seating formed by the lower edge surfaces of the offset portions 46. The tab extensions 42 and 44 are bent over to retain the link within the shell but the seating prevents entry too far into the shell.

It is to be especially noted that the link 28 is free of projecting parts and that because the offset portions are inwardly of the remainder of the flanges the bent tab extensions which exert their force on the bottom of the link are opposed to such an extent that transverse bowing is either entirely eliminated or at least minimized.

Figure 8 incidentally shows the rivets 22 and 23 and spring 20.

Looking now at Figures 9 through 11, a slightly modified form of assembly 52 is shown. In addition to the offset portion 46 between the tab extensions 42 and 44, the shell 54 is provided with offsets at 56 and 58 beyond the tab extensions and above cutaway portions at 60 and 62. The offsets 56 and 58 are inwardly struck a distance substantially equal to that of the offset at 46, namely about .008 inch in the construction described.

With the last described arrangement the offsets occurring on both sides of each tab extension, the longitudinal bending moment exerted on the link is either completely eliminated or substantially minimized.

Looking now at the preferred species of Figures 12 through 15, it is to be noted that the link 28 is identical with the previously described links. The shell 64 differs from the shells 26 and 54 in that the depending flanges are free of cutaway portions. In order to provide a seating for the link, the side depending flanges are longitudinally slit at 66 and 68 above and in alignment with the tab extensions 42 and 44. The number of slits may vary but preferably correspond with the number of tab extensions and although directly above the tab extensions the slits may be otherwise located. For example there might be three slits for two tab extensions, each of the latter being located substantially between a pair of the former.

The slits are spaced above the lower edge 38 of the depending flange by an amount substantially equal to the thickness of the link 28 to be received therein. The depending flange portions adjacent to the slits but on the side thereof remote from the tab extensions are inwardly struck or deformed by an amount greater than the combined clearances between the link and shell at the sides. In this embodiment, the link is completely concealed or surrounded at its periphery as the shell is free of any cutaway portions. Also, bending moments exerted on the link either transversely or longitudinally are effectively eliminated when the tab extensions are bent to retain the link within the shell against the seating formed by the lower edges of the offsets.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by these claims.

I claim:

1. An expansible linkage comprising a series of top links and a series of bottom links, means pivotally interconnecting the top links with the bottom links, resilient means operatively connected with said top and bottom links and normally urging said top and bottom links to their retracted position, a shell cooperative with each link of at least one of the series of links so as to provide a covering therefor, each of said shells having depending flanges completely surrounding the periphery of the link with which it cooperates, said depending flanges of each shell having a pair of tab extensions at each side bent inwardly and engaging one surface of the link received therein to retain the same within the shell, said depending flanges of each shell having slit formations in the wall portions aligned with said tab extensions, said slit formations being spaced from said tab extensions by an amount equal to the thickness of the link with which the shell cooperates, the wall portion adjacent each slit formation on the side thereof remote from said tab extensions being inwardly deformed providing a seating for the link which is held thereagainst by said tab extensions.

2. An expansible linkage comprising a series of top links and a series of bottom links, means pivotally interconnecting the top links with the bottom links, resilient means operatively connected with said top and bottom links and normally urging said top and bottom links to their retracted position, a shell cooperative with each link of at least one of the series of links so as to provide a covering therefor, each of said shells having depending side and end flanges with the inside dimensions of each shell being of slightly greater size than the outside dimensions of the link with which it cooperates, and each said shell freely receiving its respective link therein, said depending side flanges having tab means engaging one surface of the cooperative link so as to retain the link in association within the shell, and said depending side flanges each having a cut back portion inwardly bent and offset with respect to the remaining portions and engaging the opposing interior surface of said cooperative link so as to provide a seating for the link and fixedly hold the link from being pressed inwardly beyond a preselected relation to the shell, and said remaining portions of said side flanges surrounding the periphery of the link.

3. An expansible linkage comprising a series of top links and a series of bottom links, means pivotally interconnecting the top links with the bottom links, resilient means operatively connected with said top and bottom links and normally urging said top and bottom links to their retracted position, a shell cooperative with each link of at least one of the series of links so as to provide a covering therefor, each of said shells having depending side and end flanges surrounding the entire periphery of the link with which it cooperates, said depending flanges having tab means extending from the edges of the side flanges and engaging the link therein so as to hold the same concealed within the shell, each of said depending side flanges of each shell having at least one indentation spaced from said edges and tab means a distance substantially equal to the thickness of the link therein and engaging the link on the surface thereof opposite to that engaged by said tab means so as to hold the link from being pressed inwardly beyond a preselected relation to the shell associated therewith.

4. An expansible linkage comprising a series of top links and a series of bottom links, means pivotally interconnecting the top links with the bottom links, resilient means operatively connected with said top and bottom links and normally urging said top and bottom links to their retracted position, a shell cooperative with each link of at least one of the series of links so as to provide a covering therefor, each of said shells having depending side and end flanges completely surrounding the periphery of the link with which it cooperates, said depending flanges having tab means extending from the edges of the side flanges and engaging the link therein so as to hold the same substantially completely within the shell, each of said depending side flanges of each shell having at least one slit formation therein spaced from said edges of the side flanges and said tab means by an amount substantially equal to the thickness of the link therebetween, the wall portion adjacent the slit formation on the side thereof remote from said tab means being struck inwardly so as to provide a seating for the link which is held thereagainst by said tab means.

5. An expansible linkage comprising a series of top links and a series of bottom links, means pivotally interconnecting the top links with the bottom links, resilient means operatively connected with said top and bottom links and normally urging said top and bottom links to their retracted position, a shell cooperative with each link of at least one of the series of links so as to provide a covering therefor, each of said shells having continuous depending side and end flanges surrounding the periphery of the link with which it cooperates, said depending side flanges of each shell having a pair of tab extensions at each side bent inwardly so as to engage one surface of the link received therein to retain the same within the shell, said depending side flanges having the edge portions between and beyond the tab extensions at each side of the shell cut away by an amount substantially equal to the thickness of the link received within the shell so as to provide additional edge portions in a plane spaced from the remaining edge portions of the shell, said additional edge portions between and beyond said tab extensions being inwardly offset with respect to said remaining edge portions to thereby provide a seating, each link being received in a respective shell and bearing against said seating provided by said offset edge portions against which the link is held by the tab extensions, whereby substantially no bending moment is exerted on each such link.

References Cited in the file of this patent

UNITED STATES PATENTS

| | | |
|---|---|---|
| 1,288,030 | Kessler | Dec. 17, 1918 |
| 2,515,817 | Augenstein | July 18, 1950 |